(12) United States Patent
Vilasineekul et al.

(10) Patent No.: US 12,077,959 B2
(45) Date of Patent: *Sep. 3, 2024

(54) ADJUSTABLE TENSION TIE

(71) Applicant: Simpson Strong-Tie Company, Inc., Pleasanton, CA (US)

(72) Inventors: Kashane Vilasineekul, Powell, OH (US); Timothy M. Stauffer, Pleasant Hill, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,674

(22) Filed: Dec. 14, 2020

(65) Prior Publication Data
US 2021/0095462 A1    Apr. 1, 2021

Related U.S. Application Data

(62) Division of application No. 15/396,537, filed on Dec. 31, 2016, now Pat. No. 10,865,558.

(60) Provisional application No. 62/274,080, filed on Dec. 31, 2015.

(51) Int. Cl.
*E04B 1/38* (2006.01)
*E04B 1/26* (2006.01)
*F16B 25/10* (2006.01)

(52) U.S. Cl.
CPC ............ *E04B 1/388* (2023.08); *E04B 1/2608* (2013.01); *E04B 1/2612* (2013.01); *F16B 25/10* (2013.01); *E04B 2001/2684* (2013.01); *E04B 2001/405* (2013.01)

(58) Field of Classification Search
CPC .............................. E04B 1/40; E04B 1/2608
See application file for complete search history.

(56) References Cited

U.S. PATENT DOCUMENTS

| | | |
|---|---|---|
| 436,767 A | 9/1890 | Baker |
| 2,118,218 A | 5/1938 | McLaughlin |
| 2,172,796 A | 9/1939 | Krasin |
| 2,438,604 A | 3/1948 | Gogerty |
| 3,861,104 A | 1/1975 | Bower |
| 4,065,218 A | 12/1977 | Biggane |
| 4,067,168 A | 1/1978 | Thurner |

(Continued)

FOREIGN PATENT DOCUMENTS

| | | |
|---|---|---|
| DE | 9312522.4 | 8/1993 |
| DE | 29707800 | 8/1997 |

(Continued)

OTHER PUBLICATIONS

"Decks and Fences:DTT2Z/HD2AHDG/Deck Post Connectors", Simpson Strong-Tie Product Catalog C-2009, 2008, cover page and p. 165, Simpson Strong-Tie Company, Inc., USA.

(Continued)

*Primary Examiner* — Basil S Katcheves
(74) *Attorney, Agent, or Firm* — Charles R. Cypher

(57) ABSTRACT

A connection is provided where a connector can act as a holdown or tension tie and transfer tension, uplift, or lateral load between an anchored member and an anchoring member. The connector is used in combination with separate anchor and fasteners. The anchor may be tied to a concrete foundation, another connector of the same type, a wood framing member, or structural member of a similar type, or other supporting or anchoring members.

20 Claims, 17 Drawing Sheets

(56) References Cited

U.S. PATENT DOCUMENTS

| | | | |
|---|---|---|---|
| 4,069,635 A * | 1/1978 | Gilb | E04C 3/292 |
| | | | 52/693 |
| 4,321,776 A | 3/1982 | Delight | |
| 4,531,334 A | 7/1985 | Nylander et al. | |
| 4,615,157 A | 10/1986 | Murray | |
| 4,744,192 A | 5/1988 | Commins | |
| 4,825,621 A * | 5/1989 | Jensen | F16B 9/058 |
| | | | 52/702 |
| 4,888,926 A | 12/1989 | Lutz, III | |
| 5,201,156 A | 4/1993 | Newman | |
| 5,240,342 A | 8/1993 | Kresa, Jr. | |
| 5,467,570 A * | 11/1995 | Leek | E04B 1/2608 |
| | | | 52/712 |
| 5,481,844 A | 1/1996 | Kajita | |
| 5,732,519 A | 3/1998 | Leek | |
| 5,761,863 A | 6/1998 | Sutt et al. | |
| 5,813,181 A | 9/1998 | Ashton et al. | |
| 5,832,679 A | 11/1998 | Roth | |
| 5,979,130 A * | 11/1999 | Gregg | F16B 9/058 |
| | | | 52/295 |
| 6,014,843 A | 1/2000 | Crumley et al. | |
| 6,158,188 A * | 12/2000 | Shahnazarian | F16B 9/058 |
| | | | 52/702 |
| 6,250,041 B1 * | 6/2001 | Seccombe | E04B 1/2604 |
| | | | 52/712 |
| 6,260,402 B1 | 7/2001 | Leek | |
| 6,311,449 B1 | 11/2001 | Morse et al. | |
| 6,415,560 B1 | 7/2002 | Rinderer | |
| 6,427,391 B1 | 8/2002 | Lyons | |
| 6,453,634 B1 * | 9/2002 | Pryor | E04B 1/26 |
| | | | 52/285.2 |
| 7,007,438 B1 | 3/2006 | Shields et al. | |
| 7,014,383 B2 * | 3/2006 | Schmid | E04H 9/14 |
| | | | 403/231 |
| 7,065,932 B2 | 6/2006 | Roesset et al. | |
| 7,254,926 B2 | 8/2007 | Eldeen | |
| 7,356,973 B2 | 4/2008 | Roesset et al. | |
| 7,367,168 B2 | 5/2008 | Lin | |
| 7,707,785 B2 | 5/2010 | Lin | |
| 8,276,323 B2 | 10/2012 | Gray et al. | |
| 8,356,449 B2 | 1/2013 | Lin | |
| 8,555,580 B2 | 10/2013 | Vilasineekul | |
| 8,555,592 B2 * | 10/2013 | Daudet | E04B 1/2403 |
| | | | 52/489.1 |
| 8,769,887 B2 * | 7/2014 | Proffitt, Jr. | E04B 2/58 |
| | | | 52/167.3 |
| 10,538,909 B2 | 1/2020 | Dicaire et al. | |
| 10,619,344 B1 | 4/2020 | Taneichi | |
| 10,865,558 B2 * | 12/2020 | Vilasineekul | E04B 1/2612 |
| 2006/0032180 A1 * | 2/2006 | Peterson | E04B 2/96 |
| | | | 52/712 |
| 2007/0107338 A1 * | 5/2007 | Daudet | E04B 1/2403 |
| | | | 52/293.3 |
| 2009/0025308 A1 | 1/2009 | Deans et al. | |
| 2010/0126103 A1 * | 5/2010 | diGirolamo | E04B 2/58 |
| | | | 52/655.1 |

FOREIGN PATENT DOCUMENTS

| | | |
|---|---|---|
| GB | 2132073 A | 12/1982 |
| GB | 2457712 A | 8/2009 |
| GB | 2457714 | 8/2009 |
| GB | 2423532 B | 6/2010 |
| JP | 2000-320013 | 11/2000 |
| JP | 2002-364071 | 12/2002 |
| JP | 3759278 | 1/2006 |
| KR | 1284985 B1 | 10/2007 |
| WO | WO 2011/028958 | 9/2010 |

OTHER PUBLICATIONS

"Connexions et Fixations", Simpson Strong-Tie Product Catalog C-2014, 2014, front and back cover, p. 137, 143 and 153, D/G-F 2014, Simpson Strong-Tie Company, Inc., France.

"Pivot Wall Anchor", KC Metals Product Catalog, 1976, p. 33, KC Metals, Inc., USA.

"Purlin Anchors and Holdowns", PA/HPA Series: Simpson Strong-Tie Product Catalog 1987, cover page and p. 10, Simpson Strong-Tie Company, Inc., USA.

"Tension Ties", LTT/MTT/HTT Section: Simpson Strong-Tie Product Catalog, 1993, cover page and p. 20, Simpson Strong-Tie Company, Inc., USA.

"Structural Timber Connectors", HMP: Harlen Metal Products Catalog No. 390, 1990, front and back cover, p. 22, Mar. 5, 1990, Harlen Metal Products, Inc., CA, USA.

"Superspeed Connectors: Connectors and Seismic Ties for Concrete and Wood Construction", KC Metals Products Catalog 1993, 1993, front and back cover, pp. 24-27, K.C. Metals Products, Inc., USA.

"KC Metal Anchor Downs, Anchor Bolts, Anchors, Foundation Angles, Foundation Straps", ICBO Evaluation Report ER-5033, Sep. 1, 1996, p. 1-12, ICBO Evaluation Service, Inc., CA, USA.

"International Search Report and Written Opinion of the International Searching Authority," International Application No. PCT/US2016/069652, application materials, Mar. 22, 2017, 13 pages, European Patent Office, Netherlands.

"Masonry Hangers for I-Joists," website page, May 12, 2010, 3 pages, Simpson Strong-Tie Company Inc., Tamworth, UK.

"DTT Deck Tension Ties," website page, accessed May 21, 2015, 3 pages, copyright 2015, Simpson Strong-Tie Company, Inc., Pleasanton, USA.

"HDU/DTT Holdowns," catalog, Mar. 27, 2015, 1 page, C-C-2015, Simpson Strong-Tie Company, Inc., Pleasanton, USA.

"Get Your Deck Up To Code," catalog, 2015, 4 pages, F-C-DTT1Z15, Simpson Strong-Tie Company, Inc., Pleasanton, USA.

Tanaka Steel Catalog, Jun. 1997, front and back cover, pp. 24-29, 45-46, 64, 66-68, Tanaka Steel, Japan.

Tanaka Steel Catalog, Nov. 1999, front and back cover, pp. 24-27, 38, 49-51, 76-78, Tanaka Steel, Japan.

Tanaka Steel Catalog, Jul. 2001, front and back cover, pp. 40, 45, 55-57, 89, Tanaka Steel, Japan.

Tanaka Steel Catalog, Feb. 2002, front and back cover, p. 42, Tanaka Steel, Japan.

BMF Handverkerkatalog, 1989, front and back cover, p. 1.50.1, 1.50.2, 1.60.1, 1.60.2, 1.35.1, 1.35.2, 1.20.1, 1.20.2, 1.10.1, 1.10.2, BMF Bygningsbeslag A/S, Denmark.

* cited by examiner

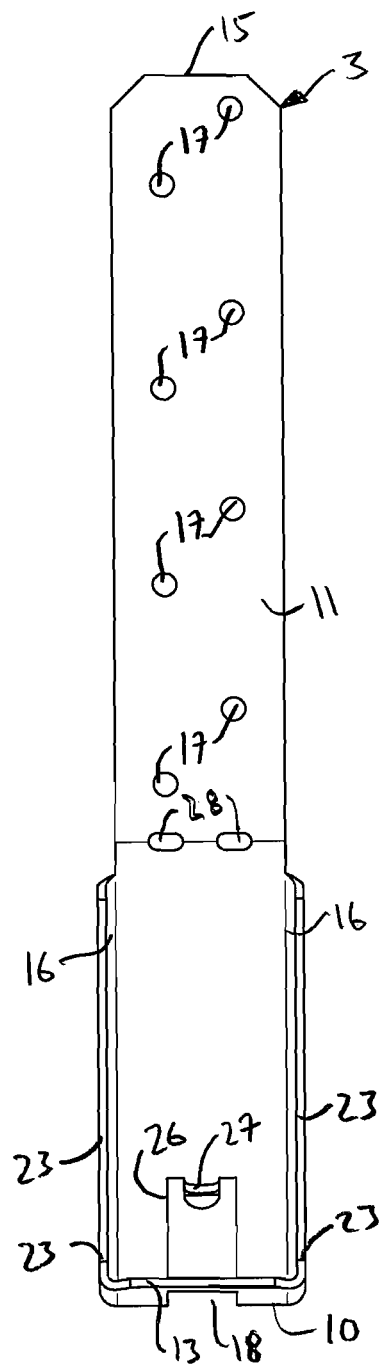
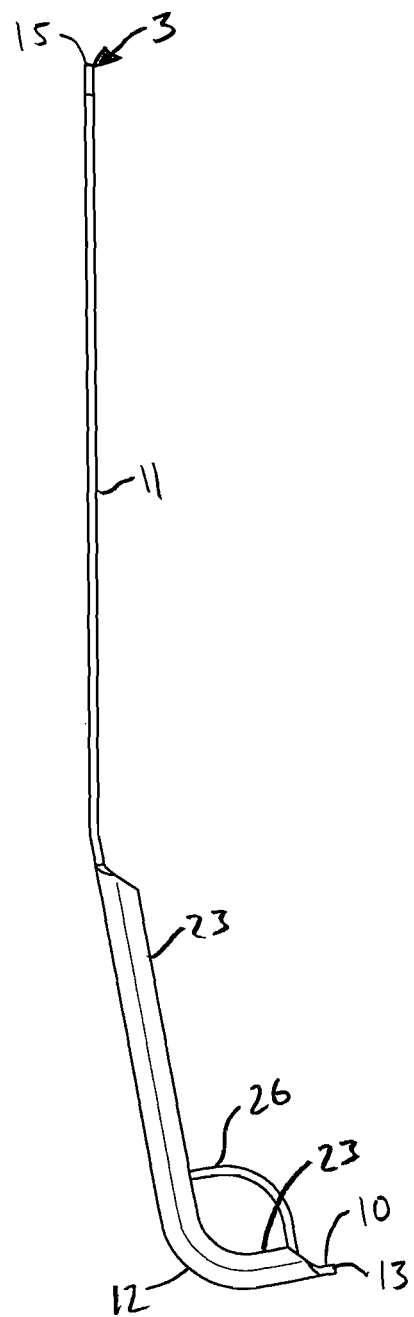
Fig. 17
Fig. 18

ADJUSTABLE TENSION TIE

BACKGROUND OF THE INVENTION

This invention relates to a sheet metal connector for anchoring an anchored structural member to anchoring structural member, and the connection made therewith. The connector works in conjunction with one or more separate anchor members that are received by the anchoring structural member and separate fasteners that attach the connector to the anchored structural member.

The present invention is particularly useful as a holdown or tension tie. As a tension tie the connector has particular utility for anchoring decks to buildings. Code requirements for anchoring decks to buildings have become more stringent, requiring decks to be anchored to interior structural members of the building. Floor joists are a particularly good anchoring structural member for decks; however, it is not always easy to access them. The present invention provides a connector that can be easily installed to different internal structural members of a building when the designer would rather not anchor the deck to the floor joists of the building.

Holdowns and tension ties are well known in the art and the subject of a number of patents. U.S. Pat. No. 8,555,580 which issued Oct. 15, 2013 and was invented by Kashane Vilasineekul, one of the inventors of the present invention, teaches a tension tie and holdown that is specifically designed for anchoring deck and deck members. The holdown and tension-tie taught in U.S. Pat. No. 8,555,580 has a split back member that is not joined to the seat member except through the side members connected to the seat. U.S. Pat. No. 4,321,776, invented by Arthur Delight and which issued on Mar. 30, 1982, teaches a holdown where the back member is connected to the seat member and side members are connected to both to strengthen the connection. U.S. Pat. No. 4,744,192, invented by Alfred D. Commins and which issued on May 17, 1988, teaches a tension tie where the side members are connected to the seat and bends along the side members create overlapping back members that then are connected to a back member extension strap. U.S. Pat. No. 5,467,570, invented by William F. Leek and which issued Nov. 21, 1995, teaches a tension tie where the back member is connected to the seat, and side members connected to the back member are folded so as to create seat flanges that overlap with the seat member. U.S. Pat. No. 5,979,130, invented by Robert C. Gregg et. al. and which issued Nov. 9, 1999, teaches a holdown where the seat and side members are drawn from the metal of the back member and the seat is curved so as to decrease deflection of the holodown. U.S. Pat. No. 6,250,041, invented by Campbell John Seccombe and which issued Jun. 26, 2001, teaches a holdown which does not have any side members, but the seat has an upstanding flange opposed from the back member. Published US Patent Application 2004/0165942, invented by Ben L. Schmid et al and published on Aug. 26, 2004, teaches a holdown where the seat, the side members and the back member are all connected.

The connector of the present invention woks in a similar fashion to most of the prior art holdowns and tension ties, such that it amenable to standard installation practices. The connector of the present invention improves on the prior art by incorporating a number of design features that make it lighter and cheaper to produce while withstanding sufficiently high tension loads, as well as allowing for a greater variety of installation options.

SUMMARY OF THE INVENTION

The present invention is a connection made with a connector that can act as a holdown or tension tie and transfer tension, uplift, or lateral load between an anchored member and an anchoring member. The connector is used in combination with separate anchor and fasteners. The anchor may be tied to a concrete foundation, another connector of the same type, a wood framing member, or structural member of a similar type, or other supporting or anchoring members.

The present invention is a connection that is part of a building structure, between an anchored member and an anchoring member made with a connector, one or more separate anchors and one or more separate fasteners, wherein the anchored member, has an attachment face, the anchoring member is disposed in relatively close association with the anchored member and has an anchoring face, the one or more separate anchors penetrate and are anchored in the anchoring member, the one or more separate fasteners penetrate and are anchored in the anchored member, and the connector has a seat member and a back member disposed at an angle to the seat member with the back member connected to the seat member at a lateral juncture, and the seat member has an end edge opposed from the lateral juncture and the seat member has opposed side edges running between the lateral juncture and the end edge, and the back member has an end edge opposed from the lateral juncture and the back member has opposed side edges running between the lateral juncture and the end edge, and wherein the seat member receives and is connected to the one or more separate anchors and the back member receives and is connected to the one or more separate fasteners.

The connector of the present invention can be fastened to nominal 2" wide structural members both with the separate fasteners that go through its back member and with the anchor that goes through its seat member such that it is ideal as a tension tie for a deck built with 2" wide joists that can be anchored to the structural framing of an interior building wall such as the studs, top plate or header of the wall, which are also typically 2" wide members. A dried wood member that is nominally 2" wide can be as narrow as 1.5" inches. The dimensions of the present connector are optimized so that the back member of the connector can attach to the narrow bottom face of a typical joist that is horizontally disposed with its narrow bottom face oriented downwardly.

The connector is preferably fastened through its back member to a joist with self-drilling wood screws, and fastened to the interior structural components of the wall of a building with a self-drilling, self-tapping anchor. The preferred anchor for anchoring in wood has a built in washer. When fastened to concrete the anchor can be an anchor suitable for such. By anchoring to the interior structural member of a building the interior structural member is protected from the elements which preserves its integrity as a strengthening member.

In one embodiment of the present invention, the one or more anchors are self-drilling and self-tapping threaded member that are drilled directly into the anchoring member.

In one embodiment of the present invention, the building structure has external members that are exposed to the elements and internal members that are protected from the elements by one or more sheathing members, and the anchored member is an external member and the anchoring member is an internal member.

In one embodiment of the present invention, the anchored member is an elongated member that is elongated along a longest dimension of the anchored member in a direction that is parallel to a portion of the back member that attaches to the anchored member, and the anchoring member is elongated along a longest dimension of the anchoring member that is orthogonally disposed to the longest dimension of the anchored member.

In one embodiment of the present invention, the back member is formed with a lateral bend such that a portion of the back member distal from the seat member is set at an angle to a portion of the back member proximal to the seat member, and the portion of the back member distal from the seat member interfaces with the anchored member and the portion of the back member proximal to the seat member angles away from the anchored member.

In one embodiment of the present invention, the opening in the seat member extends through the lateral juncture into the back member, and a bridge is provided that extends form the seat member and is joined to the back member, the bridge is made from the material used to form the opening in the seat that extends through the lateral juncture into the back member, the bridge has an opening for receiving the one or more anchors, and the opening in the bridge is elongated, allowing the one or more anchors to be positioned at different points along the opening.

In one embodiment of the present invention, portions of the side edges of the seat member are formed with lateral side flanges that strengthen the seat, the lateral side flanges preferably extend through the lateral juncture and along portions of the side edges of the back member.

In one embodiment of the present invention, the back member has one or more embossments that extend through the lateral juncture and into the seat member.

In one embodiment of the present invention, two embossments are provided that start in the back member, extend through the lateral juncture and into the seat member where the embossments bracket and encircle the portion of the seat member that receives the one or more anchoring members.

In one embodiment of the present invention, portions of the side edges of the seat member are formed with lateral side flanges that strengthen the seat, the lateral side flanges preferably extend through the lateral juncture and along portions of the side edges of the back member.

In one embodiment of the present invention, two embossments are provided that start in the back member, extend through the lateral juncture and extend to the distal edge of the seat member and bracket the portion of the seat member that receives the one or more anchoring members.

In one embodiment of the present invention, one embossment is provided in the back member that widens as it approaches the lateral juncture and extends into the seat member where it continues to widen and one or more opening are provided in the seat member for receiving the one or more anchors and these one or more openings in the seat member are formed in the embossment.

In one embodiment of the present invention, the end edge of the seat member is formed with an upturned flange.

In one embodiment of the present invention, the anchoring face of the anchoring member that receives the one or more anchors has a lateral dimension that is no wider than 1.5 inches, and the one or more anchors that are drilled into into anchoring member penetrate a minimum of 3 inches and are centered in the anchoring face of the anchoring member with respect to the lateral dimension.

In one embodiment of the present invention, the attachment face of the anchored member that receives the one or more fasteners has a lateral dimension that is no wider than 1.5 inches.

In one embodiment of the present invention, the attachment face of the anchored member is the bottom face of a horizontally disposed joist in a deck.

In one embodiment of the present invention, the anchored member is attached to the joist in a deck by means of additional fasteners.

In one embodiment of the present invention, the anchored member and the anchoring member are wooden members that are either douglas fir or souther pine grades of lumber, the connector is connected to the anchoring member with a single anchor that has diameter of 0.375 inches and is embedded in the anchoring member a minimum of 3 inches, the connector is connected to the anchored member with six threaded fasteners that are 1.5 inches long and are substantially embedded in the anchored member, the connector is made from 14 gauge sheet steel and is 1.5 inches wide, the back member 7.125 inches tall, and the seat member is 1.4375 inches deep, and the connection has an allowable tension load of 840 pounds.

BRIEF DESCRIPTION OF THE DRAWINGS

FIG. 8 is a side view of the connector of FIG. 7. The opposite side view is similar.

FIG. 17 is a front view of the connector of FIGS. 14 and 16.

FIG. 18 is a side view of the connector of FIG. 14. The opposite side view is similar.

DETAILED DESCRIPTION OF THE INVENTION

Figure 1:
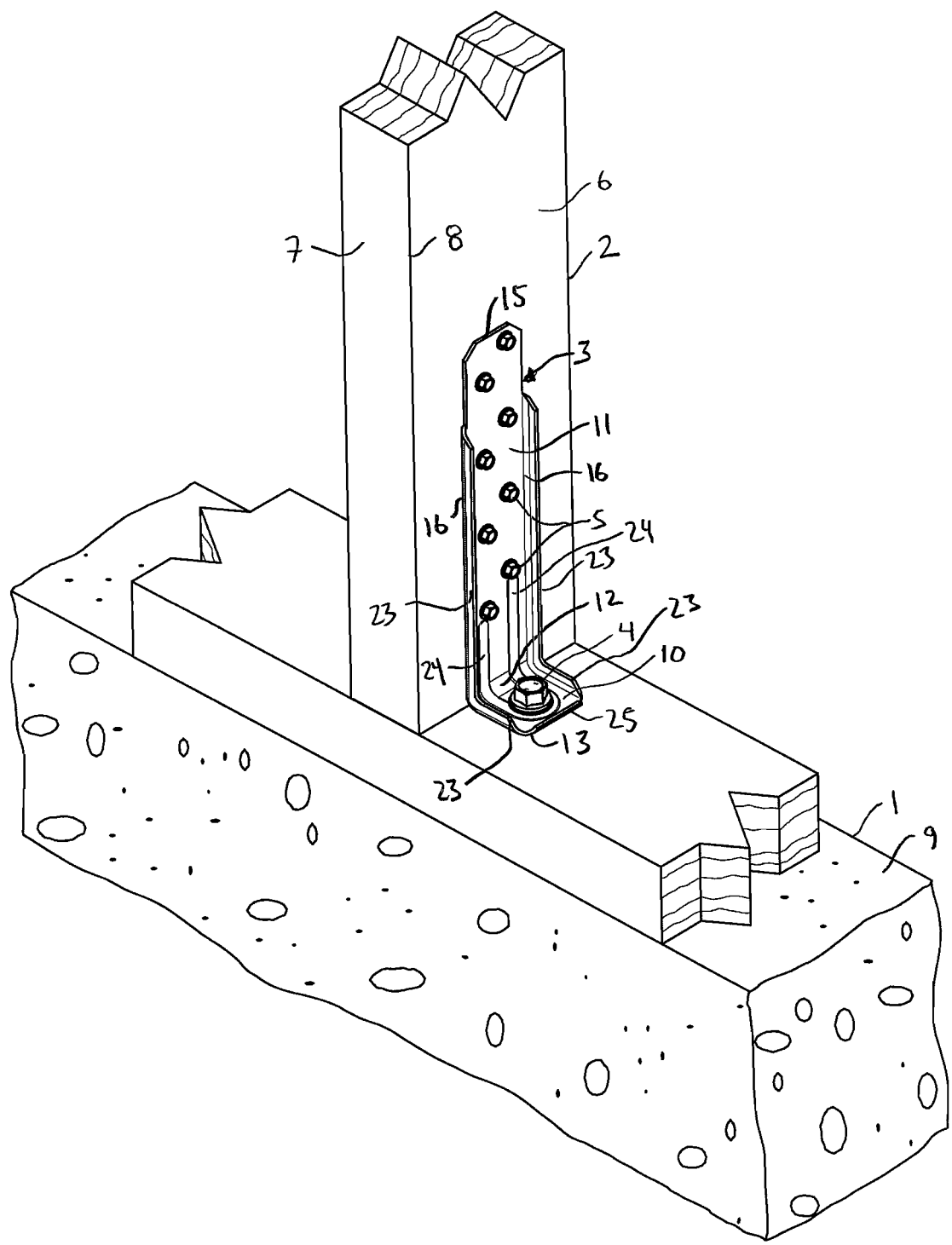
FIG. 1 is a perspective view of the connection of the present invention, showing one embodiment of the connector making a connection between a stud and a foundation. A self-tapping concrete anchor is shown, anchoring the connector to the foundation.
Figure 2:
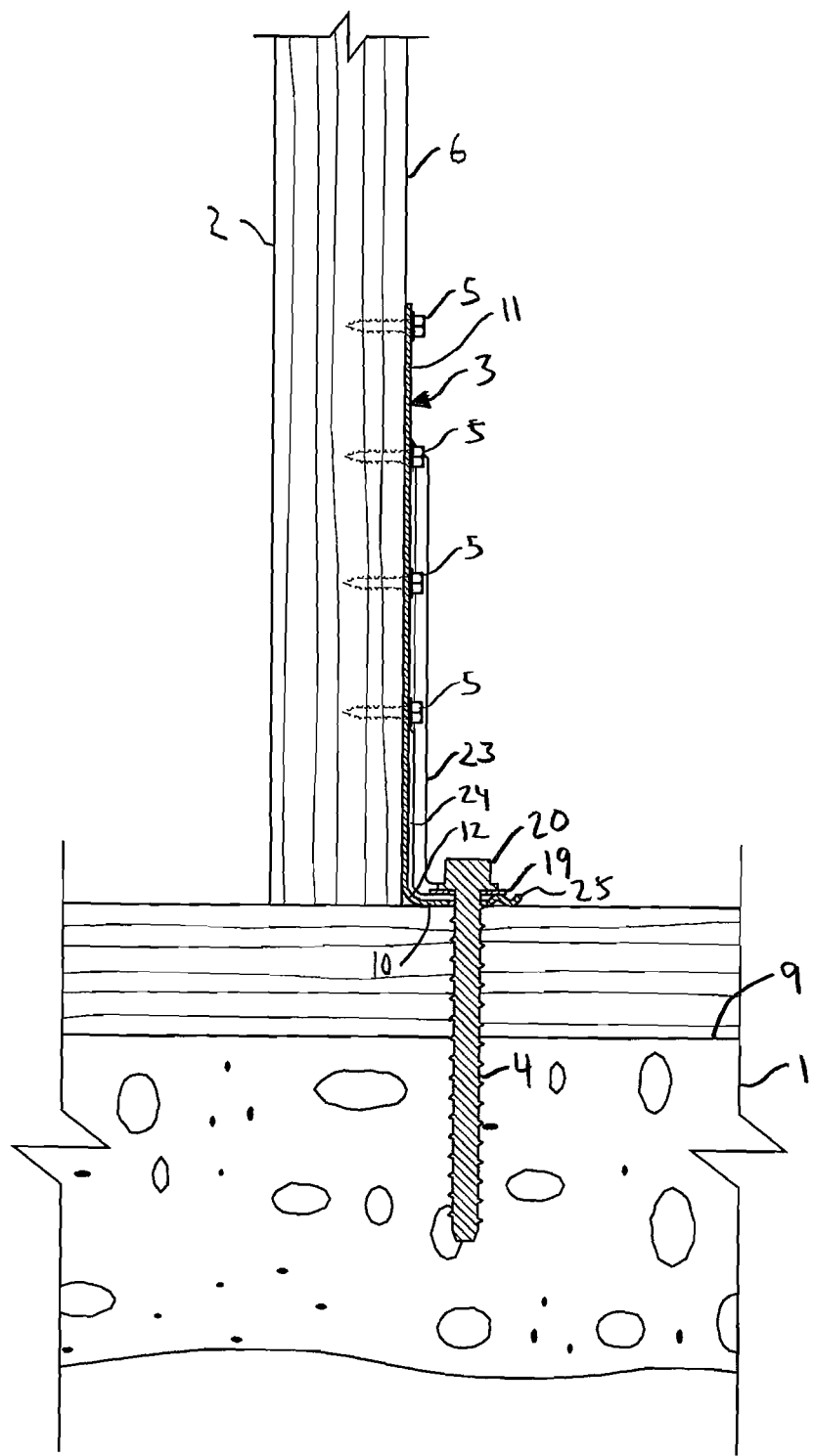
FIG. 2 is a cross-sectional side view of the connection of FIG. 1.
Figure 3:
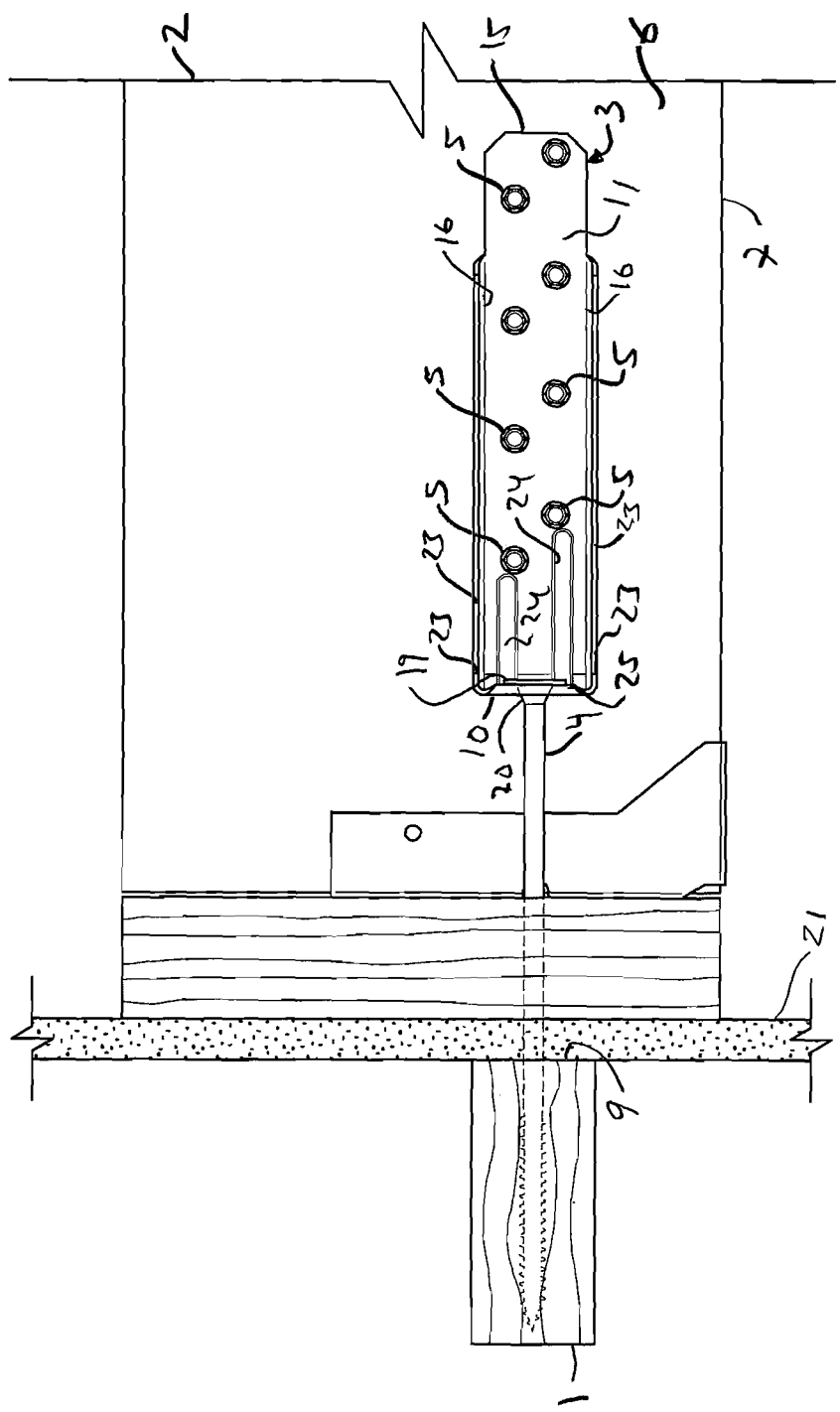
FIG. 3 is a side view of a connection of the present invention, showing one embodiment of the connector making a connection between a joist in a deck and the header of a wall.
Figure 4:
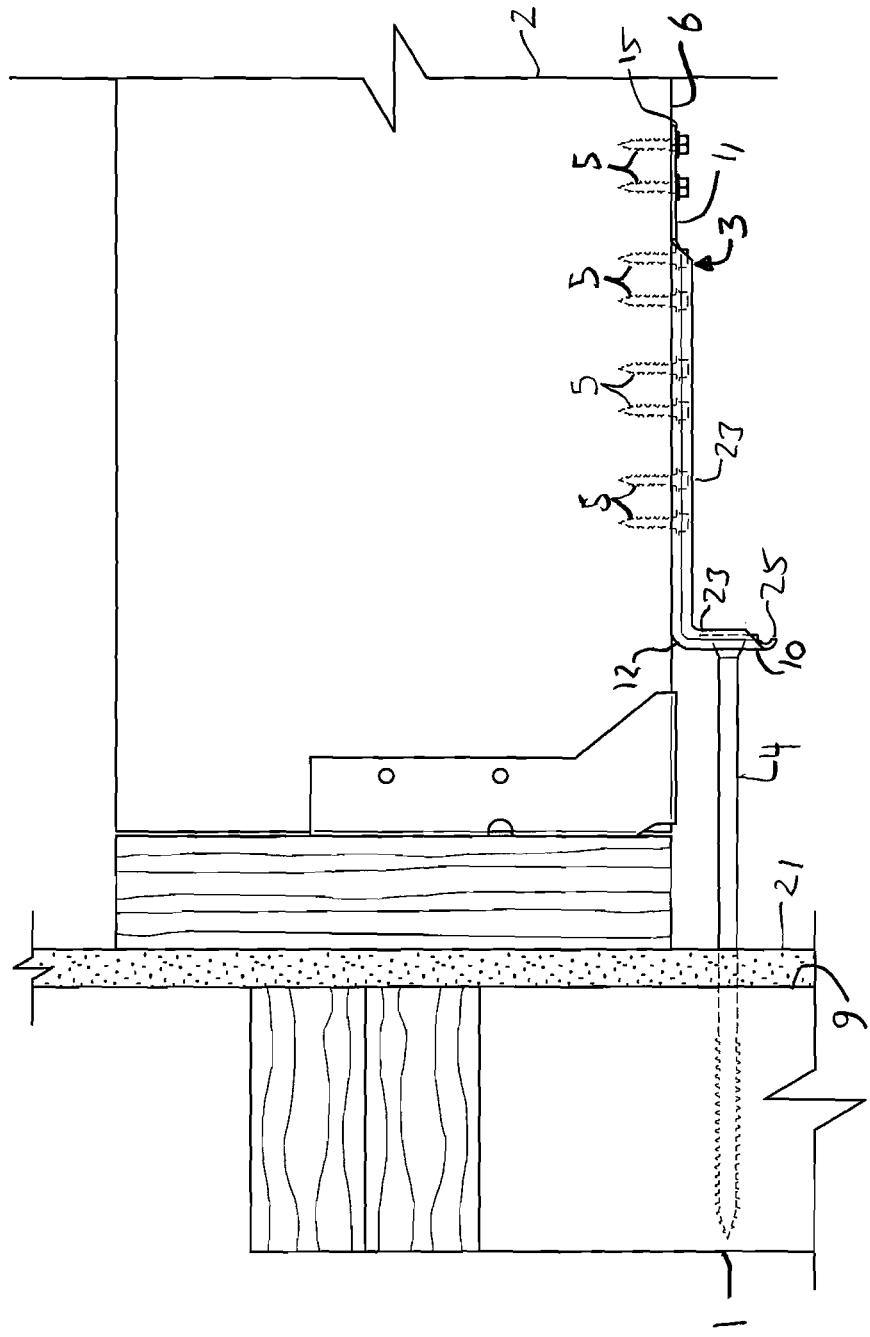
FIG. 4 is a side view of a connection of the present invention, showing one embodiment of the connector making a connection between a joist in a deck and the stud of a wall.
Figure 5:
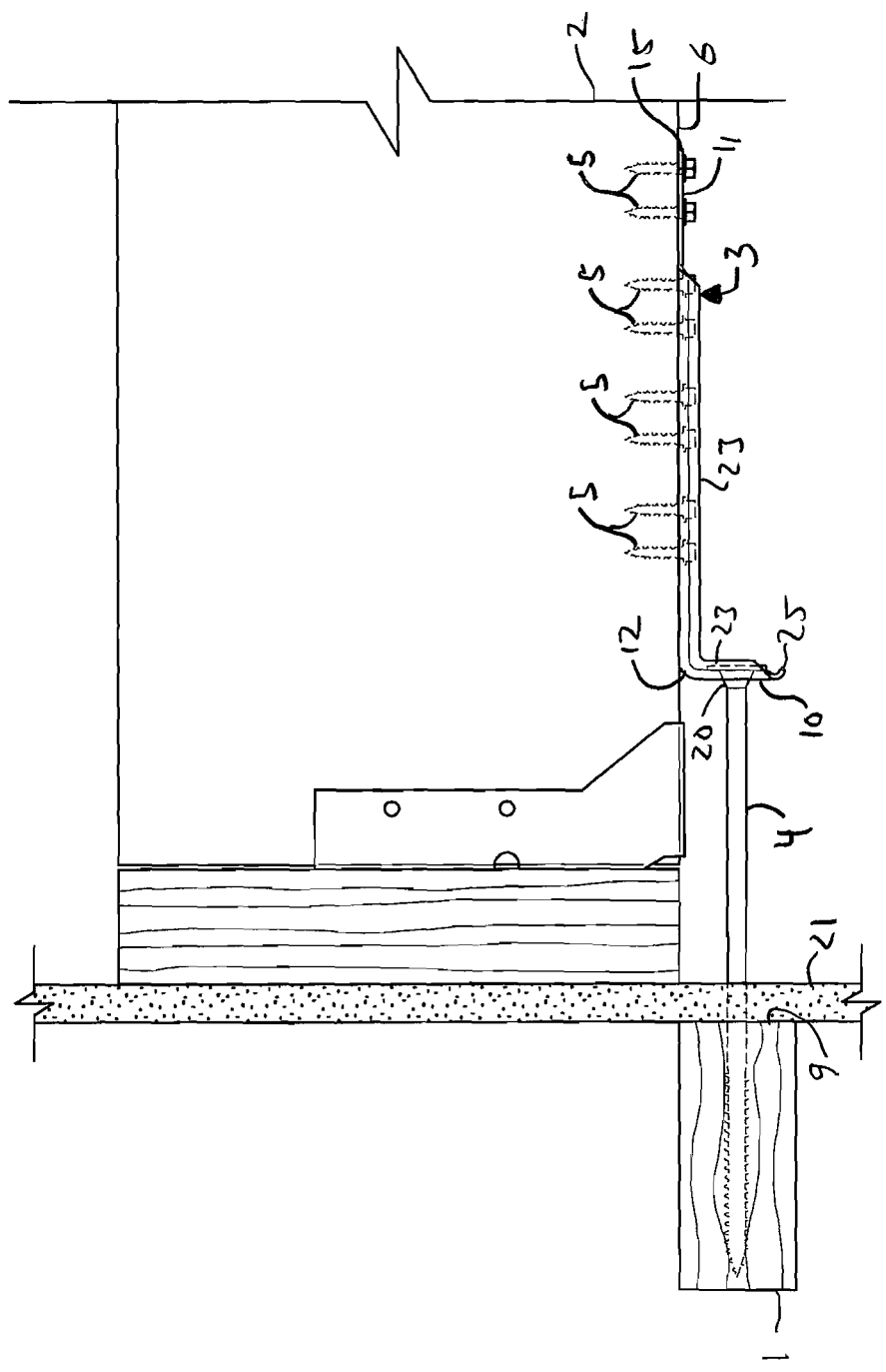
FIG. 5 is a side view of a connection of the present invention, showing one embodiment of the connector making a connection between a joist in a deck and the top plate of a wall.

The present invention provides a connection in a building structure between an anchoring member 1 and an anchored member 2. The connection uses a connector 3 in combination with one or more separate anchors 4 and one or more separate fasteners 5. The anchored member 2 has an attachment face 6. Generally, the anchored member 2 also has an edge face 7 joined to the attachment face 6 by a side edge 8. The anchoring member 1 is disposed in relatively close association with the anchored member 2 and has an anchoring face 9 where it receives the one or more anchors 4. The one or more separate anchors 4 penetrate and are anchored in the anchoring member 1. The one or more separate fasteners 5 penetrate and are anchored in the anchored member 2. The connector 3 has a seat member 10 and a back member 11 disposed at an angle to the seat member 10 with the back member 11 connected to the seat member 10 at a lateral juncture 12. The seat member 10 has an end edge 13 opposed from the lateral juncture 12 and the seat member 10 has opposed side edges 14 running between the lateral juncture 12 and the end edge 13. The back member 11 has an end edge 15 opposed from the lateral juncture 12 and the back member 11 has opposed side edges 16 running between the lateral juncture 12 and the end edge 15. The seat member 10 receives and is connected to the one or more separate anchors 4 and the back member 11 receives and is connected to the one or more separate fasteners 5.

Openings 17 are preferably provided in the back member 11 for receiving self-drilling and self-tapping threaded fasteners or nails 5 for being driven into the anchored member 2. Preferably one or more openings 18 are provided in the seat member 10 for receiving the one or more anchors 4. Preferably, just one anchor 4 is used with the connector 3 and the anchor 4 received by the opening 18 in the seat member 10 is preferably a threaded, self-tapping and self-drilling anchor 4 when the anchor 4 will be received by a wooden or similar type of anchoring member 1. When the anchor 4 is drilled into a wood anchoring member 1, it should penetrate a minimum of 3 inches and be centered in the wood anchoring member 1. The anchor 4 should be used with a washer 19 between the head 20 of the anchor 4 and the seat member 10 of the connector 3. The washer 19 can be integrally formed with the anchor 4. The wood anchoring member 1 can have a nominal width that is as little as only 2 inches. Wood members typically shrink and so wood member that are designated as being 2 inches wide are generally narrower, and can be as narrow as 1.5 inches.

The building structure is preferably a deck member attached to a house or other building, such that the connection has external members that are exposed to the elements and internal members that are protected from the elements by one or more sheathing members 21, and the anchored member 2 is an external member and the anchoring member 1 is an internal member.

Figure 6:
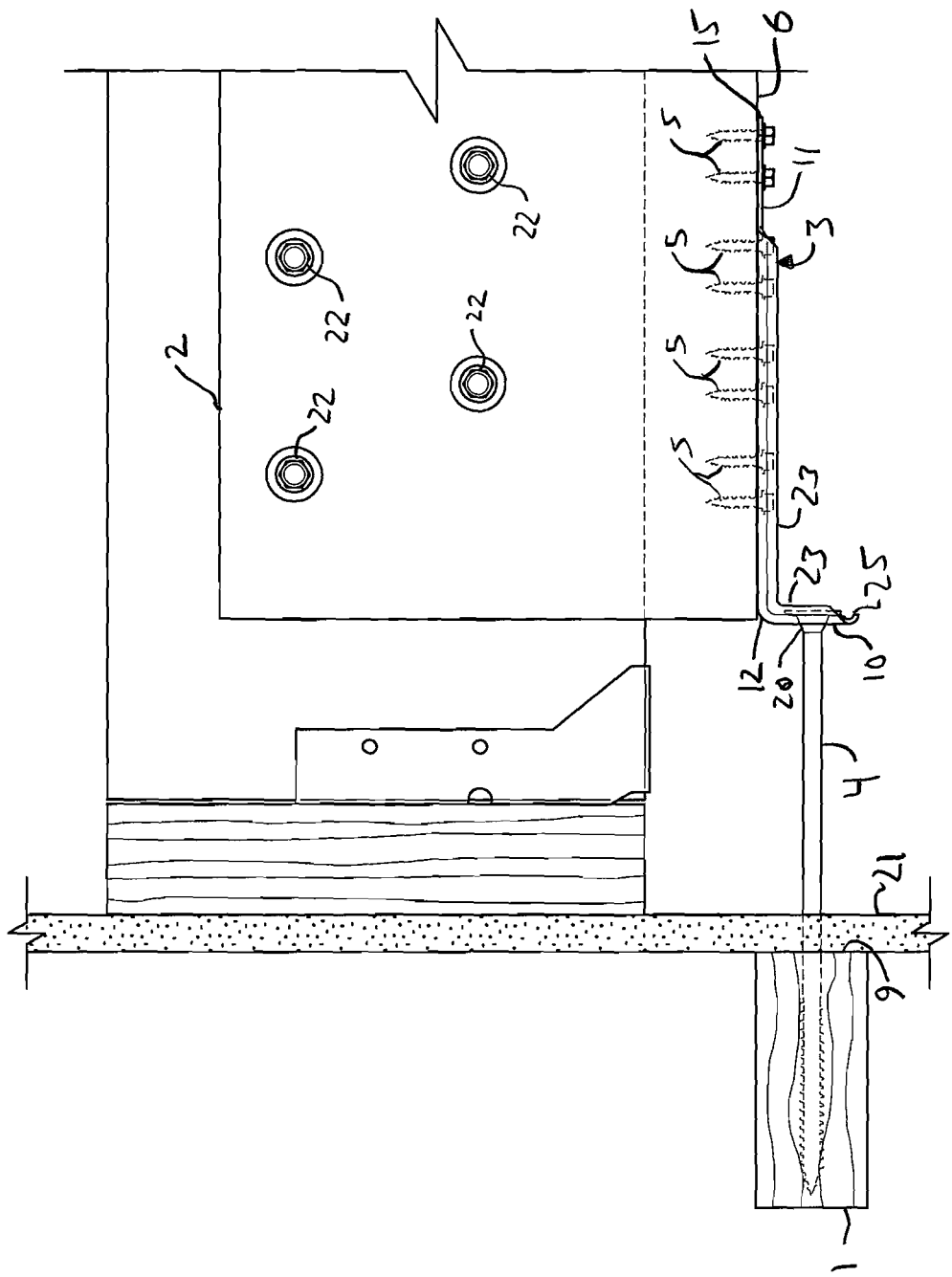
FIG. 6 is a side view of a connection of the present invention, showing one embodiment of the connector making a connection between a joist in a deck and the top plate of a wall. Blocking has been added to the joist to position the connector so that the anchor may be installed in the top plate of the wall. The blocking can be connected to the joist with threaded fasteners. A hanger is shown holding the joist to a structural member such as a ledger board. Sheathing is shown separating the joist from the top plate in the interior of the building.
Figure 7:
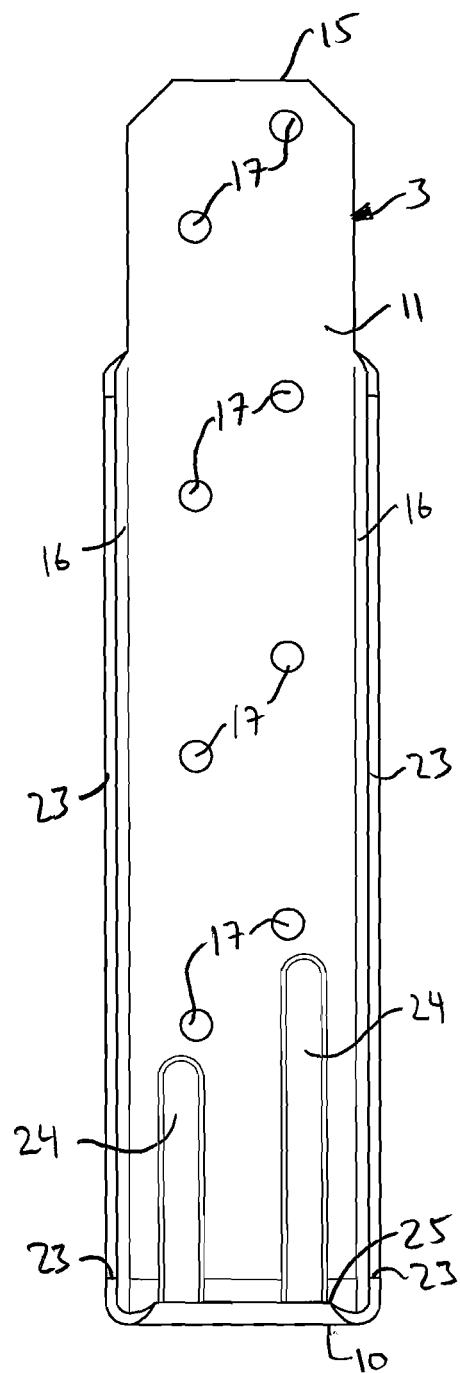
FIG. 7 is a front view of one embodiment of the connector of the present invention.

As shown in FIGS. 3, 4, 5 and 6, the anchored member 2 is an elongated member that is elongated along a longest dimension of the anchored member in a direction that is parallel to a portion of the back member 11 that attaches to the anchored member 2. In a typical installation the anchored member 2 is a joist in a deck. The anchoring member 1 is elongated along a longest dimension of the anchoring member 1 that is orthogonally disposed to the longest dimension of the anchored member 2. The anchoring member 1 can be a top plate member in a building or a header or a stud or blocking disposed between two studs. As shown in FIG. 6, the anchored member 2 can be blocking that is attached to the joist in a deck by means of additional fasteners 22.

The opening 18 in the seat member 10 may extend from the seat member 10 through the lateral juncture 12 and into the back member 11. The seat member 10 is preferably formed with lateral side flanges 23 that strengthen the seat member 10. The lateral side flanges 23 preferably extend through the lateral juncture 12 and along the side edges 16 of the back member 11 for at least a selected distance.

Figure 11:
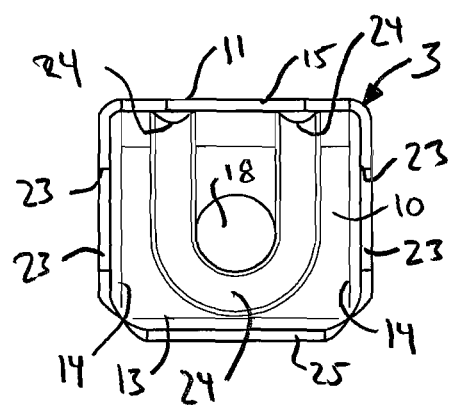
FIG. 11 is a top view of the connector of FIG. 7.
Figure 12:
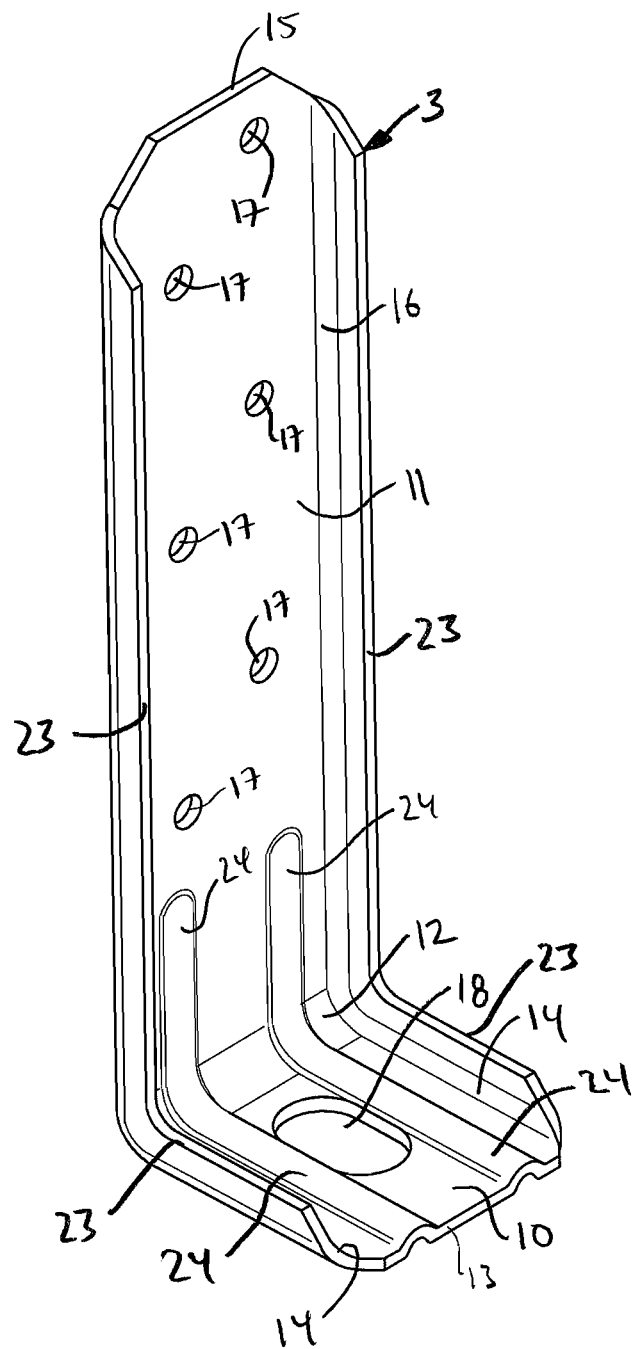
FIG. 12 is a perspective view of an alternate form of the connector.
Figure 13:
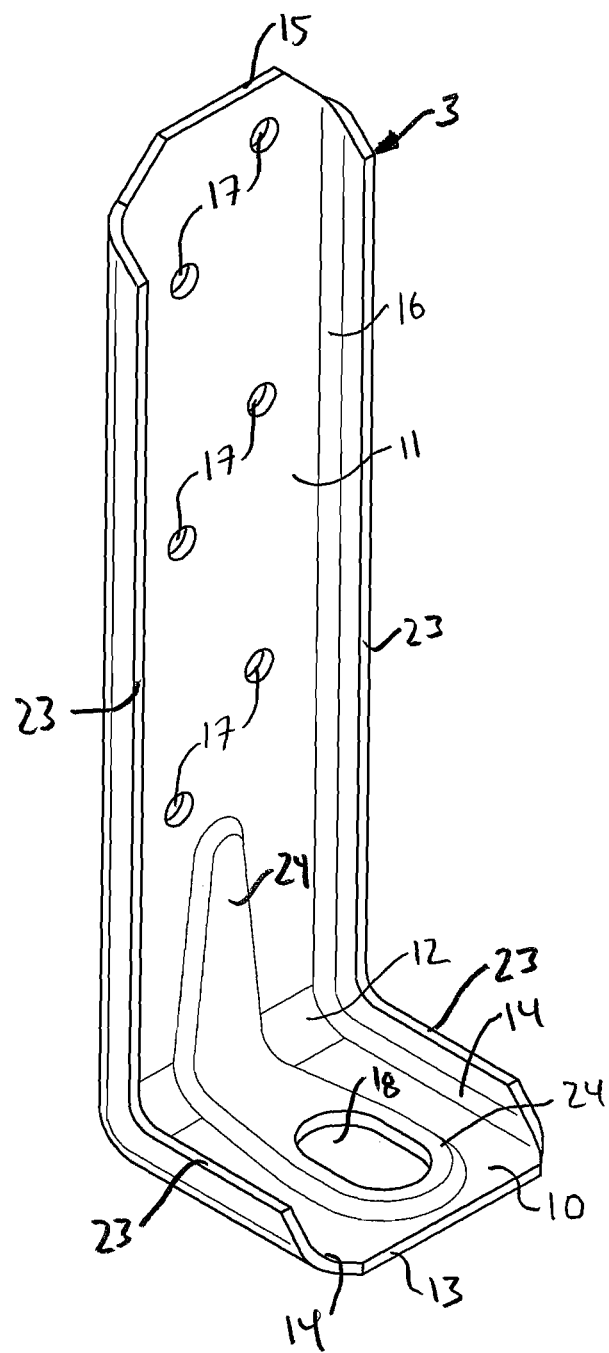
FIG. 13 is a perspective view of an alternate form of the connector.
Figure 14:
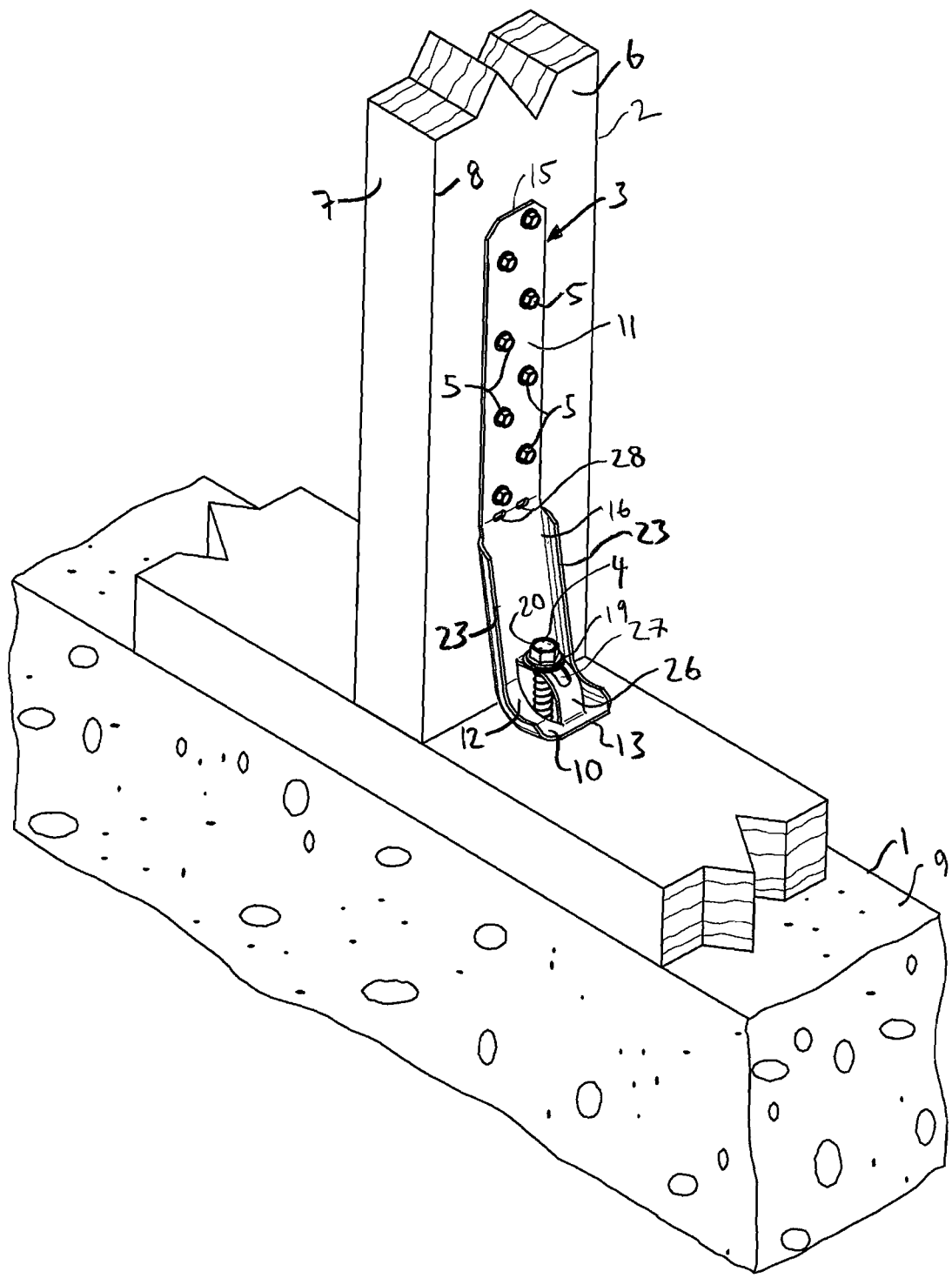
FIG. 14 is a perspective view of the connection of the present invention, showing one embodiment of the connector making a connection between a stud and a foundation.

One or more embossments 24 are preferably formed in the back member 11. The embossments 24 preferably extend through the lateral juncture 12 and into the seat member 10 and surround or bracket the one or more openings 18 in the seat member 10. As shown in FIG. 12, two parallel embossments 24 are provide that start in the back member 11, extend through the lateral juncture 12 and extend to the end edge 13 of the seat member 10 and bracket the one or more openings 18 in the seat member 10. As shown in FIG. 13, one embossment 24 is provided in the back member 11 that widens as it approaches the lateral juncture 12 and extends into the seat member 10 where it continues to widen and the opening 18 in the seat member 10 is formed in the embossment 24. As shown in FIG. 11, a pair of embossments 24 may be provided in the back member 11 that extend through the lateral juncture 12 and circle the opening 18 in the seat member 10 and then meet.

Figure 8:
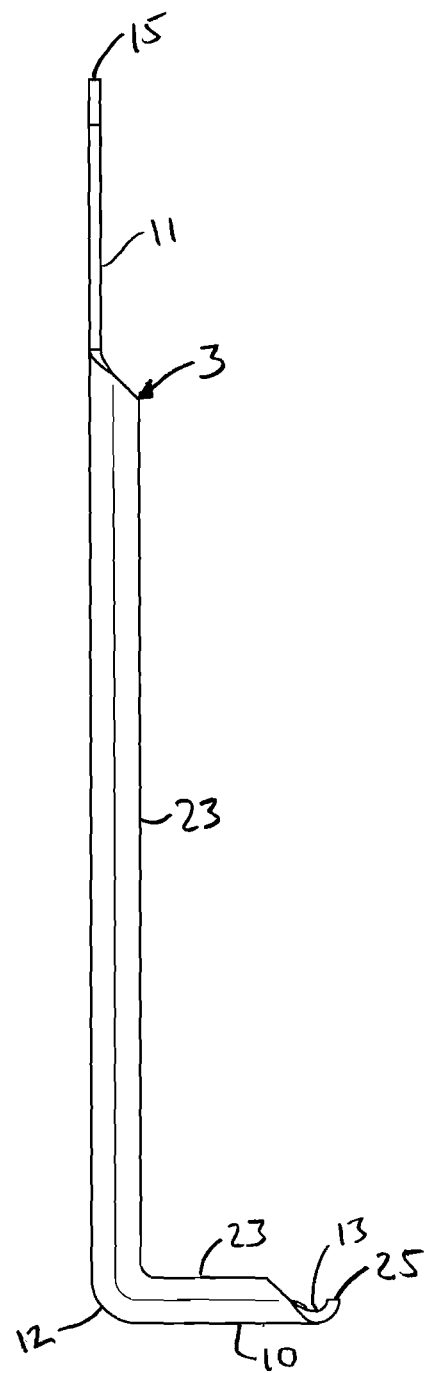
Figure 9:
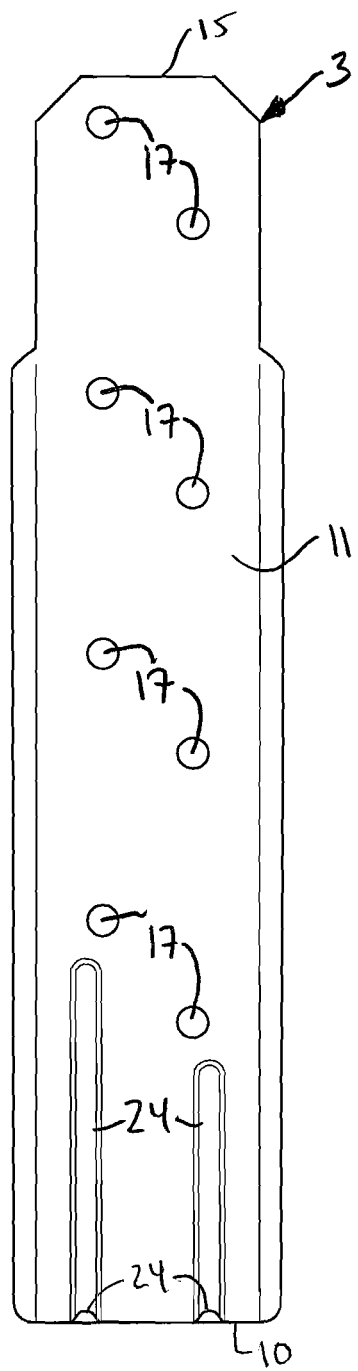
FIG. 9 is a back view of the connector of FIG. 7.
Figure 10:
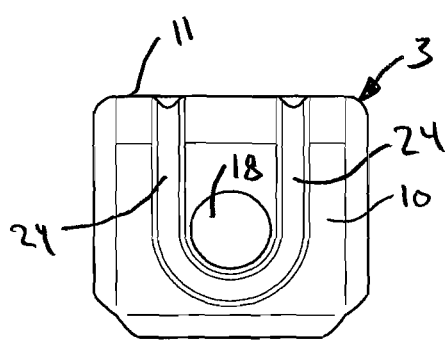
FIG. 10 is a bottom view of the connector of FIG. 7.

As shown in FIG. 8, the end edge 13 of the seat member 10 that is opposed from the lateral juncture 12 with the back member 11 may be provided with an upturned end or flange 25 to strengthen the seat member 10.

In certain embodiments as shown in FIG. 17, a bridge 26 may be provided that extends form the seat member 10 and is joined to the back member 11. Preferably, the bridge 26 is made from the material used to form the opening 18 in the seat that extends through the lateral juncture 12 into the back member 11. The bridge 26 has an opening 27 for receiving the anchor 4 that is elongated allowing the anchor 4 to be positioned at different points along the opening 27. The bridge 26 assists with allowing the seat member 10 of the connector 3 shown in FIG. 17 to be set at different angles with respect to the anchoring member 1.

Figure 15:
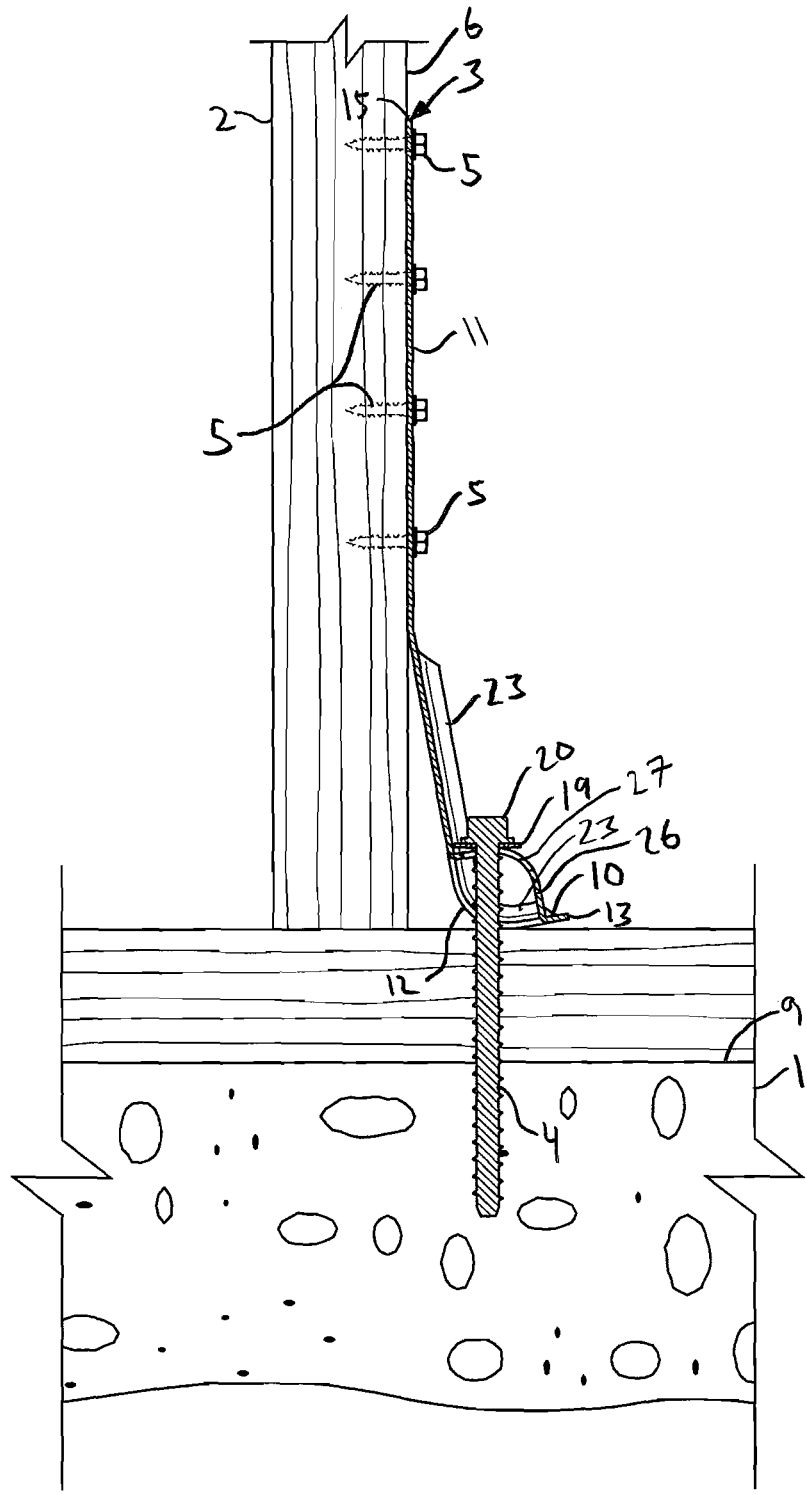
FIG. 15 is a cross-sectional side view of the connection of FIG. 14.
Figure 16:
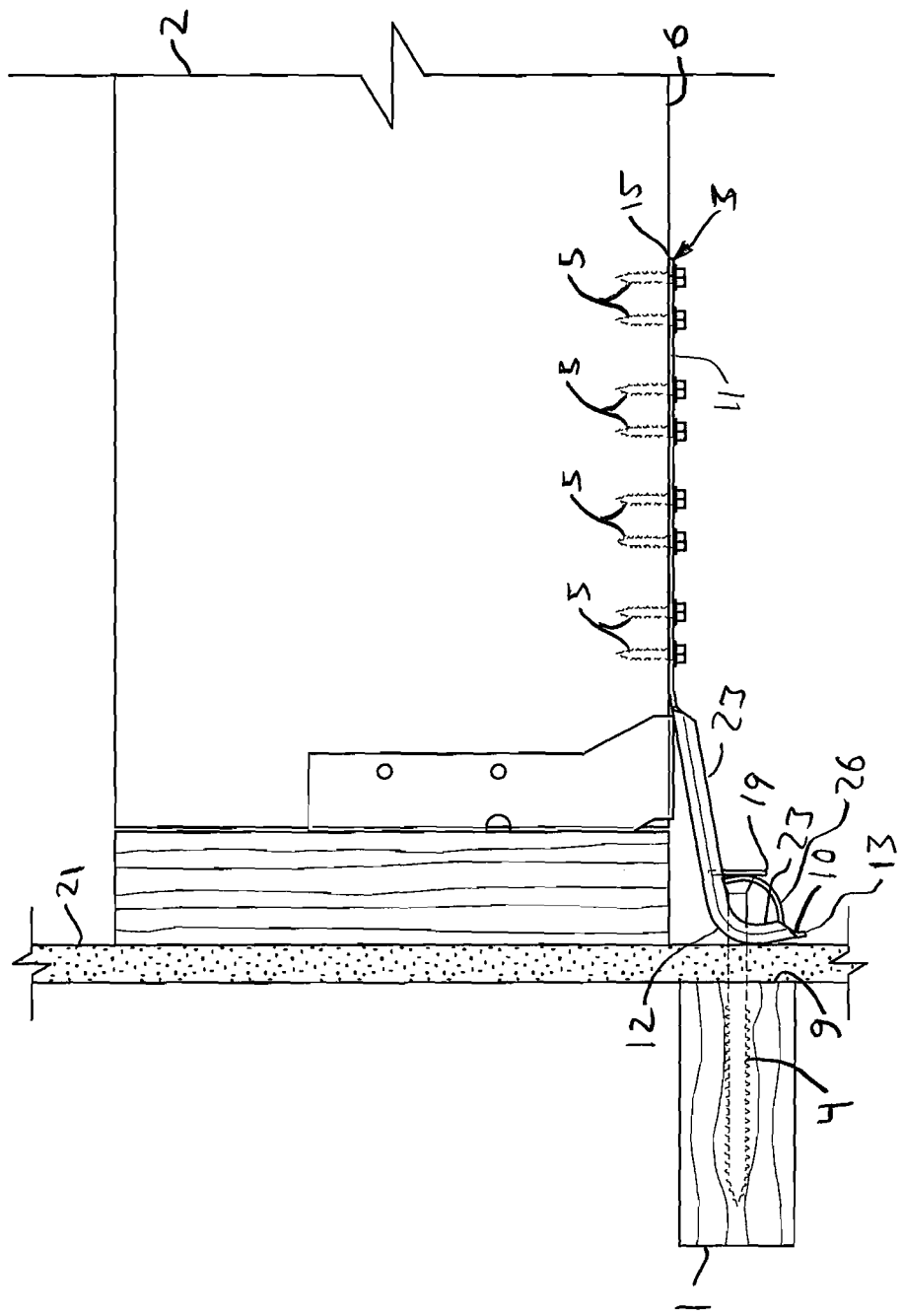
FIG. 16 is a side view of a connection of the present invention, showing one embodiment of the connector making a connection between a joist in a deck and the top plate of a wall.
Figure 19:
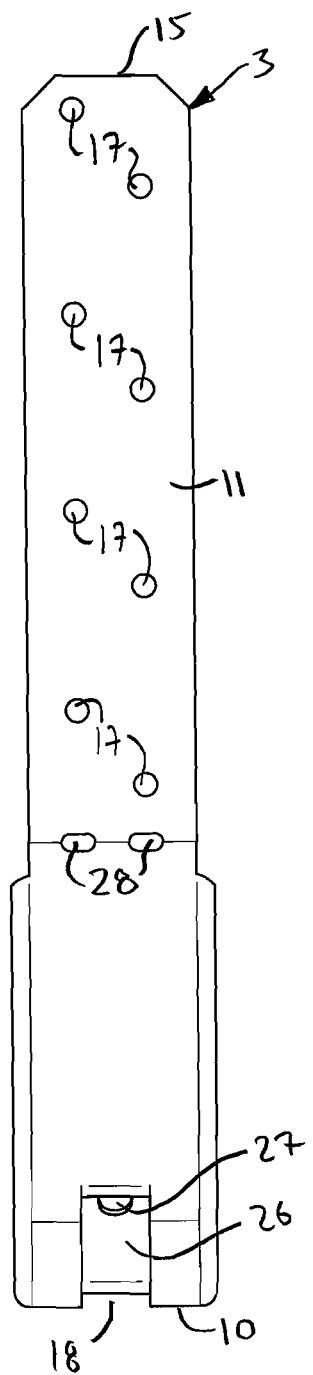
FIG. 19 is a back view of the connector of FIG. 14.
Figure 20:
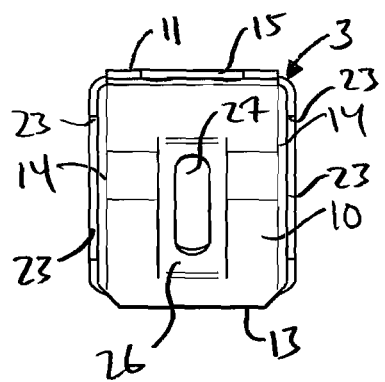
FIG. 20 is a top view of the connector of FIG. 14.
Figure 21:
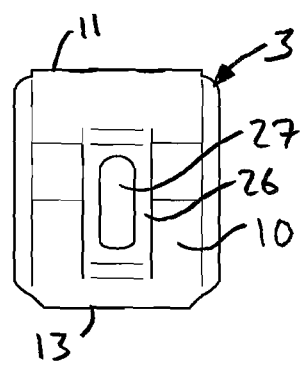
FIG. 21 is a bottom view of the connector of FIG. 14.

The back member 11 of the connector 3 shown in FIG. 17 is designed so that a bend can be formed in the back member 11 so that the seat member 10 can be positioned at different lengths from where the back member 11 connects to the anchored member 2. The bend is typically formed where the lateral side flanges end in the connector 3. Openings 28 may be provided in the back member 11 to assist with the bending of the connector 3 in the field. These openings 28 are preferably obround. FIGS. 15 and 16 show the connector 3 being bent to position the anchor 4 farther from the attachment face 6 of the anchored member 2. The back member 11 is formed with a lateral bend such that a portion of the back member 11 distal from the seat member 10 is set at an angle to a portion of the back member 11 proximal to the seat member 10, and the portion of the back member 11 distal from the seat member 10 interfaces with the anchored member 2 and the portion of the back member 11 proximal to the seat member 10 angles away from the anchored member 2.

The connector 3 is preferably made from sheet steel by punching and bending the sheet steel material. The steel can be stainless steel or coated with zinc or some other anti-corrosive material.

As shown in FIG. 12, when the connector 3 is made from 14 gauge sheet steel and is 1.5 inches wide, 7.125 inches tall, and the seat member 10 is 1.4375 inches deep, and the center line for the opening 18 in the seat member 10 is located 0.75 inches from the back member 11, and is used with an anchor 4 that has diameter of 0.375 inches, 6 threaded #9 fasteners 5 that connect the back member 11 to the anchored member 2 that are 1.5 inches long, the connection achieves a allowable tension load of 840 pounds with douglas fir or southern pine wood members.

We claim:

1. A connection that is part of a building structure, between an anchored member and an anchoring member made with a connector, one or more separate anchors and one or more separate fasteners, the connection comprising:
   a. the anchored member, having an attachment face;
   b. the anchoring member disposed in relatively close association with the anchored member and having an anchoring face;
   c. the one or more separate anchors penetrating and anchored in the anchoring member;
   d. the one or more separate fasteners penetrating and anchored in the anchored member;
   e. the connector having a seat member and a back member disposed at an angle to the seat member with the back member connected to the seat member at a lateral juncture, and the seat member has an end edge opposed from the lateral juncture and the seat member has opposed side edges running between the lateral juncture and the end edge, and the back member has an end edge opposed from the lateral juncture and the back member has opposed side edges running between the lateral juncture and the end edge, and wherein the seat member receives and is connected to the one or more separate anchors and the back member receives and is connected to the one or more separate fasteners; wherein,
   f. the seat member has one or more openings for receiving the one or more separate anchors and the end edge of the seat member is formed with an upturned flange; and
   g. one embossment is provided in the back member that extends into the seat member.

2. The connection of claim 1, wherein:
the one or more anchors are self-drilling and self-tapping threaded member that are drilled directly into the anchoring member.

3. The connection of claim 1, wherein:
the building structure has external members that are exposed to the elements and internal members that are protected from the elements by one or more sheathing members, and the anchored member is an external member and the anchoring member is an internal member.

4. The connection of claim 3, wherein:
a. the anchored member is an elongated member that is elongated along a longest dimension of the anchored member in a direction that is parallel to a portion of the back member that attaches to the anchored member; and
b. the anchoring member is elongated along a longest dimension of the anchoring member that is orthogonally disposed to the longest dimension of the anchored member.

5. The connection of claim 4, wherein:
a. the back member is formed with a lateral bend such that a portion of the back member distal from the seat member is set at an angle to a portion of the back member proximal to the seat member, and
b. the portion of the back member distal from the seat member interfaces with the anchored member and the portion of the back member proximal to the seat member angles away from the anchored member.

6. The connection of claim 1, wherein:
portions of the side edges of the seat member are formed with lateral side flanges that strengthen the seat, the lateral side flanges extend through the lateral juncture and along portions of the side edges of the back member.

7. The connection of claim 6, wherein:
the building structure has external members that are exposed to the elements and internal members that are protected from the elements by one or more sheathing members, and the anchored member is an external member and the anchoring member is an internal member.

8. The connection of claim 7, wherein:
a. the anchored member is an elongated member that is elongated along a longest dimension of the anchored member in a direction that is parallel to a portion of the back member that attaches to the anchored member; and
b. the anchoring member is elongated along a longest dimension of the anchoring member that is orthogonally disposed to the longest dimension of the anchored member.

9. The connection of claim 8, wherein:
a. the back member is formed with a lateral bend such that a portion of the back member distal from the seat member is set at an angle to a portion of the back member proximal to the seat member, and
b. the portion of the back member distal from the seat member interfaces with the anchored member and the portion of the back member proximal to the seat member angles away from the anchored member.

10. The connection of claim 1, wherein:
a. the anchoring face of the anchoring member that receives the one or more anchors has a lateral dimension that is no wider than 1.5 inches, and
b. the one or more anchors that are drilled into anchoring member penetrate a minimum of 3 inches and are centered in the anchoring face of the anchoring member with respect to the lateral dimension.

11. The connection of claim 1, wherein:
the attachment face of the anchored member that receives the one or more fasteners has a lateral dimension that is no wider than 1.5 inches.

12. The connection of claim 11, wherein:
the attachment face of the anchored member is the bottom face of a horizontally disposed joist in a deck.

13. The connection of claim 12, wherein:
a. the back member is formed with a lateral bend such that a portion of the back member distal from the seat member is set at an angle to a portion of the back member proximal to the seat member, and
b. the portion of the back member distal from the seat member interfaces with the anchored member and the portion of the back member proximal to the seat member angles away from the anchored member.

14. The connection of claim 11, wherein:
the attachment face of the anchored member is the bottom face of a horizontally disposed joist in a deck.

15. The connection of claim 1, wherein;
the anchored member is attached to the joist in a deck by means of additional fasteners.

16. The connection of claim 1, wherein:
a. the anchored member and the anchoring member are wooden members that are either douglas fir or southern pine grades of lumber;
b. the connector is connected to the anchoring member with a single anchor that has diameter of 0.375 inches and is embedded in the anchoring member a minimum of 3 inches;
c. the connector is connected to the anchored member with six threaded fasteners that are 1.5 inches long and are substantially embedded in the anchored member;
d. the connector is made from 14 gauge sheet steel and is 1.5 inches wide, the back member 7.125 inches tall, and the seat member is 1.4375 inches deep, and the connection has an allowable tension load of 840 pounds.

17. A connection that is part of a building structure, between an anchored member and an anchoring member made with a connector, one or more separate anchors and one or more separate fasteners, the connection comprising:
a. the anchored member, having an attachment face;
b. the anchoring member disposed in relatively close association with the anchored member and having an anchoring face;
c. the one or more separate anchors penetrating and anchored in the anchoring member;
d. the one or more separate fasteners penetrating and anchored in the anchored member;
e. the connector having a seat member and a back member disposed at an angle to the seat member with the back member connected to the seat member at a lateral juncture, and the seat member has an end edge opposed from the lateral juncture and the seat member has opposed side edges running between the lateral juncture and the end edge, and the back member has an end edge opposed from the lateral juncture and the back member has opposed side edges running between the lateral juncture and the end edge, and wherein the seat member receives and is connected to the one or more separate anchors and the back member receives and is connected to the one or more separate fasteners; wherein,
f. the seat member has one or more openings for receiving the one or more separate anchors;
g. portions of the side edges of the seat member are formed with lateral side flanges that strengthen the seat, the lateral side flanges extend through the lateral juncture and along portions of the side edges of the back member; and
h. two or more embossments are provided that start in the back member, extend through the lateral juncture and into the seat member where the embossments bracket the portion of the seat member that receives the one or more separate anchors and then meet.

18. The connection of claim 17, wherein:
the one or more anchors are self-drilling and self-tapping threaded member that are drilled directly into the anchoring member.

19. The connection of claim 17, wherein:
the building structure has external members that are exposed to the elements and internal members that are protected from the elements by one or more sheathing members, and the anchored member is an external member and the anchoring member is an internal member.

20. The connection of claim 17, wherein:
the end edge of the seat member is formed with an upturned flange.

* * * * *